No. 691,024. Patented Jan. 14, 1902.
E. W. VOGEL.
BATTERY CHUTE OR WELL.
(Application filed Nov. 5, 1900.)
(No Model.) 2 Sheets—Sheet 1.
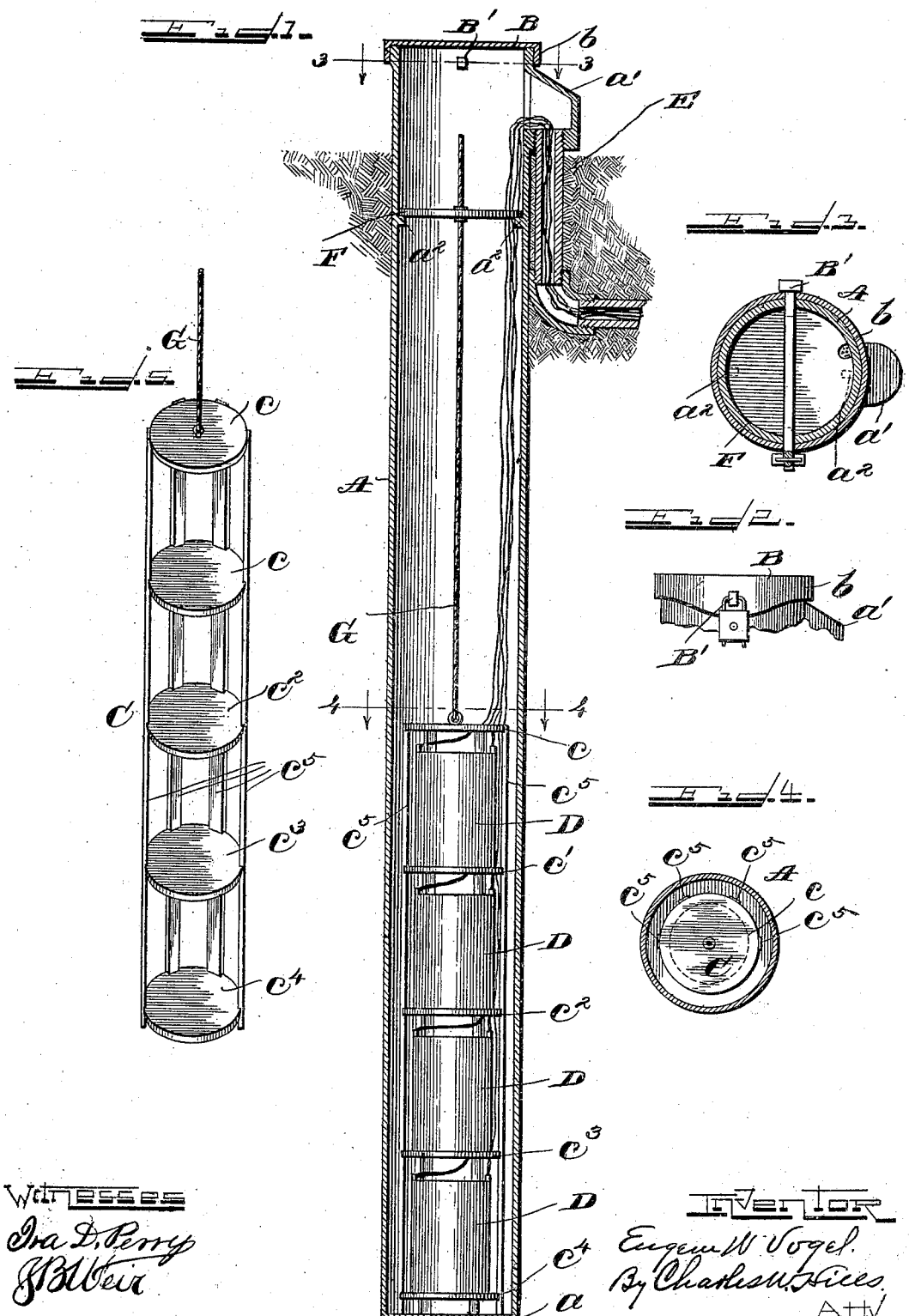
Witnesses
Ira D. Perry
J. B. Weir
Inventor
Eugene W. Vogel.
By Charles W. Rices
Att'y
THE NORRIS PETERS CO., PHOTO-LITHO., WASHINGTON, D. C.

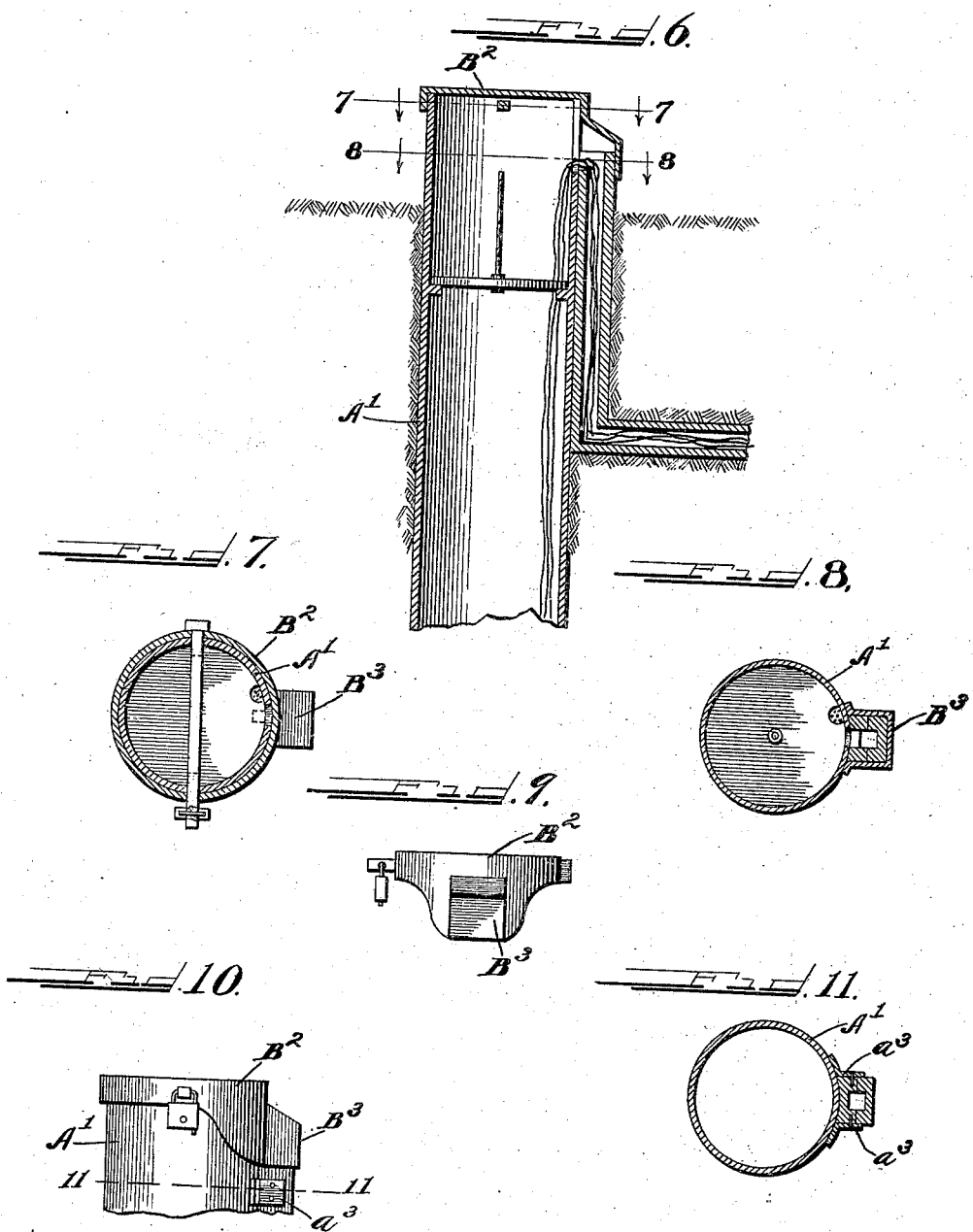

UNITED STATES PATENT OFFICE.

EUGENE W. VOGEL, OF CHICAGO, ILLINOIS, ASSIGNOR TO DAVID S. WEGG, OF CHICAGO, ILLINOIS.

BATTERY CHUTE OR WELL.

SPECIFICATION forming part of Letters Patent No. 691,024, dated January 14, 1902.

Application filed November 5, 1900. Serial No. 35,559. (No model.)

*To all whom it may concern:*

Be it known that I, EUGENE W. VOGEL, a citizen of the United States, and a resident of Chicago, in the county of Cook and State of Illinois, have invented certain new and useful Improvements in Battery-Chutes; and I do hereby declare that the following is a full, clear, and exact description thereof, reference being had to the accompanying drawings, and to the letters of reference marked thereon, which form a part of this specification.

This invention relates to improvements in battery-chutes of that class designed to be set in the earth and adapted to protect an electric battery therein contained from accidental injury and from moisture and changes in temperature. Heretofore no satisfactory device of this class has been produced, owing to the difficulty found in forming a water-tight joint at the lower end of the chute.

My invention provides cheap and simple means for preventing moisture from finding its way within the chute and effectually protects the battery from changes in temperature. Furthermore, my improved battery-chute is adapted to contain a battery with any desired number of cells and provides means for effectually protecting the wiring both within and without the chute.

The invention consists in the matters hereinafter described, and more fully pointed out and defined in the appended claims.

In the drawings, Figure 1 is a vertical longitudinal section of a device embodying my invention, showing the same as it appears when set in the earth. Fig. 2 is a fragmentary side elevation of the same, illustrating one means for securing the cover on the chute. Fig. 3 is a section taken on line 3 3 of Fig. 1. Fig. 4 is a section taken on line 4 4 of Fig. 1. Fig. 5 is a perspective view of the battery-elevator. Fig. 6 is a longitudinal section of another form of my invention. Fig. 7 is a section taken on line 7 7 of Fig. 6. Fig. 8 is a section taken on line 8 8 of Fig. 6. Fig. 9 is a front elevation of the cap. Fig. 10 is a fragmentary side elevation. Fig. 11 is a section taken on line 11 11 of Fig. 10.

As shown in said drawings, A indicates a tubular casing or shell forming the battery-chute, herein shown as an integral cylindric tube of cast-iron or other suitable material closed at its lower end. Said chute may be of any desired length or diameter and is provided near its upper or open end with an aperture extending through the side walls. $a'$ indicates an outwardly and downwardly projecting hood integral with the side wall above said aperture, and which depends below the lower edge of said aperture. At each end said flange is joined integrally with the side wall of the casing at the sides of said aperture, thereby providing a hood above and at the sides of said aperture, which opens downwardly and is adapted to receive the batten or molding or wire trunking designed to receive the wires from the battery.

B indicates the cover, as herein shown consisting of a plate, preferably metallic, having a diameter greater than the diameter of the chute and provided on its periphery with a lateral depending flange $b$, adapted to receive the upper end of the casing A, as indicated in Figs. 1 and 2. Said flange $b$ is provided on diametrically opposite sides with an aperture extending therethrough, registering with like apertures in opposite sides of said casing and adapted to receive the locking-bolt $B'$ therethrough, as indicated in Figs. 1, 2, and 3. Said bolt, as shown, is rectangular, though obviously the same may be of any desired shape in cross-section and is provided at one end with a head larger than the apertures and at the other end is apertured to receive the bolt of a lock of any desired kind, as indicated in Figs. 2 and 3. For the purpose of reducing weight the flange $b$, except at points adjacent to the said apertures, is made relatively narrow.

C indicates a battery-elevator, preferably made of material which is a non-conductor of heat or electricity, such as wood. As herein shown, said elevator is adapted to hold four cells, though obviously a greater or less number may be provided for by increasing or decreasing the number of compartments in said elevator. Said elevator consists of a plurality of circular plates $c\ c'\ c^2\ c^3\ c^4$, rigidly secured along one hundred and eighty degrees of the circumference of each by means of a plurality of cleats $c^5$, herein shown as four in number, spaced equal distances apart, as indicated in Fig. 5. One side of each compartment of said elevator is thus left open to permit the insertion therein of the battery-cells D, as shown in Fig. 1. Said cleats at their lower ends preferably project below the plate $c^4$ and act to support the lower battery-cell above the lower end of the chute.

The battery-cells may be of any desired kind and may be connected as preferred. The conductor-wires of the same are led upwardly and out of the aperture beneath the flange $a'$ and into and along a molding or wire trunking E of familiar form, the upper end of which extends upwardly within the hood and is thereby rigidly secured on the casing, as indicated in Fig. 1. From the lower end of said molding or wire trunking the conductor-wires lead to the point where it is desired to use the current.

For the purpose of effectually protecting the battery from the changes in temperature the chute above the battery is divided into two chambers by means of a closely-fitting plate F, which, as shown, is supported by projecting lugs $a^2$ on the inner side of the tube A. Said plate is provided on one side with a notch to permit the conductor-wires to pass between the same and the side of the chute and may be connected on its under side by means of a rope or cord G, connected in an eye on the upper end of the elevator, said connection, as shown, being made at the central part of the plate $c$. Said rope or cord G, as shown, is passed centrally through said plate F and is sufficiently long to permit the end of the same being readily reached from above when the cover is removed. Obviously, however, any desired means for lifting the elevator may be employed.

If preferred, the casing may be slotted at the upper end and the hood may be provided on the cover, as illustrated in Figs. 6 to 11, inclusive, in which A′ indicates the casing similar to that before described, but slotted on one side at its upper end.

B² indicates the cover, which is similar to that before described and is provided on one side with a projecting downwardly-opening hood B³, adapted to extend below the slot in the casing and to receive the end of the wire trunking. Lugs $a^3$ are provided along the side of the casing, adapted to receive between the same the wire trunking and provided with apertures adapted to receive a nail or other desired means for rigidly securing said trunking to the casing.

The operation of my device is as follows: When it is desired to replenish or examine the batteries, the cover B is removed and the battery-elevator, with the battery therein, is lifted out by means of the rope G or other desired means engaging an eye thereon. As the elevator and battery move upwardly the conductor-wires also move upwardly, and owing to the construction described a sharp bend or kinking of the wire is thereby prevented, avoiding injury to the insulation and greatly increasing the life of the wires. If it is not desired to use as many cells as the number indicated herein, the chute may be made proportionately shorter. In the same manner if more battery-cells are required the chute may be lengthened as desired.

Obviously many features of construction may be modified without departing from the principle of my invention.

I claim as my invention—

1. A battery-chute adapted to be buried in the ground, comprising an integral cast-metal casing having a closed end, the length of said casing being at least twice its width, substantially as described.

2. In a battery-chute, the combination with an integral cast-metal tubular casing closed at its lower end and provided near its upper end with a lateral opening, of a cap having a downwardly-opening hood covering said end and lateral opening, substantially as described.

3. In a battery-chute the combination with an integral tubular casing sealed at its lower end and divided into two non-communicating chambers, of a transverse removable partition supported on projecting lugs integral with the inner side of the casing.

4. In a battery-chute the combination with an integral tubular casing sealed at its lower end and provided near its upper end with a lateral opening, of a cover having a downwardly-opening hood covering said opening on the outer side, and a transverse removable partition intermediate of the ends of the casing and supported on an integral shoulder on the inner side thereof.

5. The combination with an integral tubular battery-chute sealed at its lower end and provided near its upper end with a lateral opening of a cover having a downwardly-opening hood covering said opening and a tube secured at its upper end within said hood and extending outwardly therefrom.

6. The combination with a tubular battery-chute sealed at its lower end and provided at its upper end with a lateral opening of a cap adapted to close the upper end of said tube and provided with a laterally-extending downwardly-opening hood adapted to cover said opening and a tube secured at its upper end in said hood and extending outwardly therefrom.

7. A battery-chute adapted to be buried in the ground consisting of an integral casing having a closed lower end and a cover engaged directly to the other end substantially as described.

8. The combination with a battery-chute consisting of an integral tubular casing sealed at the lower end, of a removable cover adapted to be secured at the upper end thereof, a transverse bolt passing through registering apertures in said cover and the upper end of said casing, substantially as described.

9. In a battery-chute the combination with a tubular casing sealed at its lower end, of a flanged cover adapted to be removably secured to the upper end of said casing by means of a part engaging said flange and said casing and a laterally and downwardly projecting hood secured to said cover adapted to afford means for admitting conductor-wires into the chute.

10. In a device of the class described, the combination with an integral tubular casing sealed at its lower end and provided with an opening near its upper end, of a flanged cover adapted to be removably secured at the top of said casing, a laterally-projecting downwardly-opening hood formed integral with said cover and adapted to close the opening in said casing and to receive one end of a wire trunking.

11. In a device of the class described the combination with a tubular casing sealed at one end and provided at its other end with a lateral opening of a detachable flanged cover adapted to close the upper end of said chute provided with a laterally and downwardly projecting hood adapted to cover said lateral opening and means for locking said cover on said casing comprising a part adapted to engage the casing and flanged cover.

12. In a battery-chute the combination with a tubular casing sealed at its lower end and provided at its upper end with a lateral opening of a flanged cover adapted to close the upper end of said casing and provided at one side with a laterally-extending downwardly-opening hood adapted to cover the lateral opening in the casing, means for locking said cover to the casing and lugs disposed on said casing in alinement with the lateral opening and affording means together with said hood for securing wire trunking to the chute.

In witness whereof I have hereunto subscribed my name in the presence of two subscribing witnesses.

EUGENE W. VOGEL.

Witnesses:
CHARLES W. HILLS,
LOUIS J. DELSON.